United States Patent
Oh et al.

(10) Patent No.: US 9,798,900 B2
(45) Date of Patent: Oct. 24, 2017

(54) FLEXIBLE COUNTER SYSTEM FOR MEMORY PROTECTION

(71) Applicant: Intel Corporation, Santa Clara, CA (US)

(72) Inventors: Jungju Oh, San Jose, CA (US); Siddhartha Chhabra, Hillsboro, OR (US); David M Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 44 days.

(21) Appl. No.: 14/670,061

(22) Filed: Mar. 26, 2015

(65) Prior Publication Data
US 2016/0283748 A1   Sep. 29, 2016

(51) Int. Cl.
*G06F 21/78* (2013.01)
*G06F 21/72* (2013.01)
*G06F 21/52* (2013.01)

(52) U.S. Cl.
CPC .............. *G06F 21/78* (2013.01); *G06F 21/52* (2013.01); *G06F 21/72* (2013.01)

(58) Field of Classification Search
None
See application file for complete search history.

(56) References Cited

U.S. PATENT DOCUMENTS

| | | | |
|---|---|---|---|
| 6,138,230 | A | 10/2000 | Hervin et al. |
| 8,171,309 | B1 | 5/2012 | Poo et al. |
| 2002/0169942 | A1 | 11/2002 | Sugimoto |
| 2003/0044007 | A1 | 3/2003 | Matthews |

(Continued)

FOREIGN PATENT DOCUMENTS

| | | |
|---|---|---|
| TW | 201112853 A | 4/2011 |
| TW | 201116009 A | 5/2011 |
| WO | 2013-100965 A1 | 7/2013 |

OTHER PUBLICATIONS

Elbaz et al., TEC-Tree: A Low-Cost, Parallelizable Tree for Efficient Defense Against Memory Replay Attacks, 2007, Springer-Verlag.*

(Continued)

*Primary Examiner* — Saleh Najjar
*Assistant Examiner* — Louis Teng
(74) *Attorney, Agent, or Firm* — Grossman, Tucker, Perreault & Pfleger, PLLC

(57) ABSTRACT

The present disclosure is directed to a flexible counter system for memory protection. In general, a counter system for supporting memory protection operations in a device may be made more efficient utilizing flexible counter structures. A device may comprise a processing module and a memory module. A flexible counter system in the memory module may comprise at least one data line including a plurality of counters. The bit-size of the counters may be reduced and/or varied from existing implementations through an overflow counter that may account for smaller counters entering an overflow state. Counters that utilize the overflow counter may be identified using a bit indicator. In at least one embodiment selectors corresponding to each of the plurality of counters may be able to map particular memory locations to particular counters.

20 Claims, 8 Drawing Sheets

(56) References Cited

U.S. PATENT DOCUMENTS

| | | | |
|---|---|---|---|
| 2004/0213370 A1* | 10/2004 | Smallwood | H04L 12/2602 377/118 |
| 2005/0288925 A1* | 12/2005 | Liardet | H03K 3/84 704/226 |
| 2006/0005047 A1 | 1/2006 | Lekatsa et al. | |
| 2006/0107047 A1 | 5/2006 | Bar-El | |
| 2006/0277395 A1 | 12/2006 | Fowles | |
| 2007/0011421 A1* | 1/2007 | Keller | G06F 1/3225 711/165 |
| 2007/0180272 A1 | 8/2007 | Trezise et al. | |
| 2008/0117679 A1 | 5/2008 | Srinivasan et al. | |
| 2008/0155271 A1 | 6/2008 | Barck et al. | |
| 2009/0019317 A1 | 1/2009 | Quach et al. | |
| 2009/0086881 A1 | 4/2009 | Yoon et al. | |
| 2009/0240919 A1 | 9/2009 | Alexander et al. | |
| 2010/0189064 A1 | 7/2010 | Raveendran | |
| 2010/0250965 A1 | 9/2010 | Olson | |
| 2011/0055489 A1* | 3/2011 | Reddy | G06F 12/0831 711/141 |
| 2011/0072242 A1 | 3/2011 | Lee et al. | |
| 2011/0145482 A1 | 6/2011 | Yu et al. | |
| 2012/0079283 A1* | 3/2012 | Hashimoto | G06F 12/1425 713/189 |
| 2012/0278635 A1 | 11/2012 | Hars et al. | |
| 2014/0040632 A1 | 2/2014 | Chhabra et al. | |
| 2014/0101461 A1 | 4/2014 | Chhabra et al. | |
| 2014/0208109 A1 | 7/2014 | Trevedi et al. | |
| 2014/0223197 A1 | 8/2014 | Gueron et al. | |
| 2015/0293855 A1* | 10/2015 | Gschwind | G06F 3/0604 711/118 |
| 2015/0349967 A1 | 12/2015 | Chen et al. | |
| 2015/0370728 A1* | 12/2015 | Yamada | G06F 12/1416 711/163 |
| 2016/0098215 A1* | 4/2016 | Song | G06F 3/0619 711/103 |
| 2016/0170889 A1* | 6/2016 | Lee | G06F 12/0862 711/118 |
| 2017/0083724 A1 | 3/2017 | Chhabra et al. | |

OTHER PUBLICATIONS

Szefer et al., Towards Fast Hardware Memory Integrity Checking with Skewed Merkle Trees, 2014, ACM.*

Haifeng et al., Memory Confidentiality and Integrity Protection Method Based on Variable Length Counter, 2014, Journal of Algorithms & Computational Technology.*

Rogers et al., Using Address Independent Seed Encryption and Bonsai Merkle Trees to Make Secure Processors OS- and Performance-Friendly, 2007, Proceedings of the 40th Annual IEEE/ACM International Symposium on Microarchitecture pp. 183-196.*

Haifeng, Ma, et al.: "Memory Confidentiality and Integrity Protection Method Based on Variable Length Counter", Journal of Algorithms & Computational Technology, vol. 8, No. 4, Dec. 1, 2014, pp. 421-439.

Rogers, Brian, et al.: "Using Address Independent Seed Encryption and Bonsai Merkle Trees to Make Secure Processors OS- and Performance-Friendly", 40th IEEE/ACM International Symposium om Microarchitecture, 2007, pp. 183-194.

Szefer, Jakub, et al.: "Towards Fast Hardware Memory Integrity Checking with Skewed Merkle Trees", ACM, Jun. 15, 2014, 8 pages.

Elbaz, Reouven, et al.: "TEC-Tree: A Low-Cost, Parallelizable Tree for Efficient Defense Against Memory Replay Attacks", Springer-Verlag, 2007, pp. 289-302.

U.S. Appl. No. 15/282,575, filed Sep. 30, 2016, unpublished.

International Search Report and Written Opinion issued in PCT Application No. PCT/US2016/019890, dated Jun. 1, 2016, 12 pages.

International Search Report and Written Opinion issued in PCT Application No. PCT/US2016/045408, dated Nov. 2, 2016, 14 pages.

International Search Report and Written Opinion issued in PCT Application No. PCT/US2016/018266, dated Jun. 8, 2016, 13 pages.

Final Office Action issued in U.S. Appl. No. 14/661,044, dated Sep. 29, 2016, 22 pages.

Office Action issued in U.S. Appl. No. 14/661,044, dated Mar. 24, 2016, 20 pages.

Notice of Allowance issued in U.S. Appl. No. 13/976,930, dated Feb. 9, 2015, 19 pages.

International Search Report and Written Opinion issued in PCT Application No. PCT/US2011/067590, dated Aug. 27, 2012, 8 pages.

International Preliminary Report on Patentability and Written Opinion issued in PCT Application No. PCT/US2011/067590, dated Jul. 10, 2014, 5 pages.

Taiwanese Office Action and Search Report issued in Taiwanese Application No. 101149324, dated Feb. 11, 2015, with English translation, 12 pages.

* cited by examiner

FLEXIBLE COUNTER SYSTEM FOR MEMORY PROTECTION

TECHNICAL FIELD

The present disclosure relates to data security, and more particularly, to a flexible counter system with reduced memory consumption usable for supporting memory protection operations.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device, that is exchanged with a processor in the computing device, etc. is a major vulnerability.

Device manufacturers, component manufacturers, software developers, etc. continue to try to develop protective measure to combat vulnerabilities. Software-based malware detection and elimination solutions typically operate at the privilege level of an operating system (OS) in the computing device. These solutions may be effective against lower privilege attacks, but may not be able to combat higher-privileged malware like rootkits. Some hardware-based protective solutions are now emerging that are instituted very early during boot-up of a computing device, and thus may establish protective measures before malware even becomes active. Known-good protection firmware may be loaded early on during boot-up that may perform various functions such as checking whether subsequently loaded software comports with known-good versions, establishing protected areas of memory wherein data may be protected from being accessed by hostile software, etc. While the benefits of these protective measures may be apparent, at least one issue that hardware protection systems may require support systems that consume valuable resources in the device such as, for example, processing capacity, nonvolatile memory space, etc. The consumption of these resources may be more substantial in larger-scale systems like servers.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
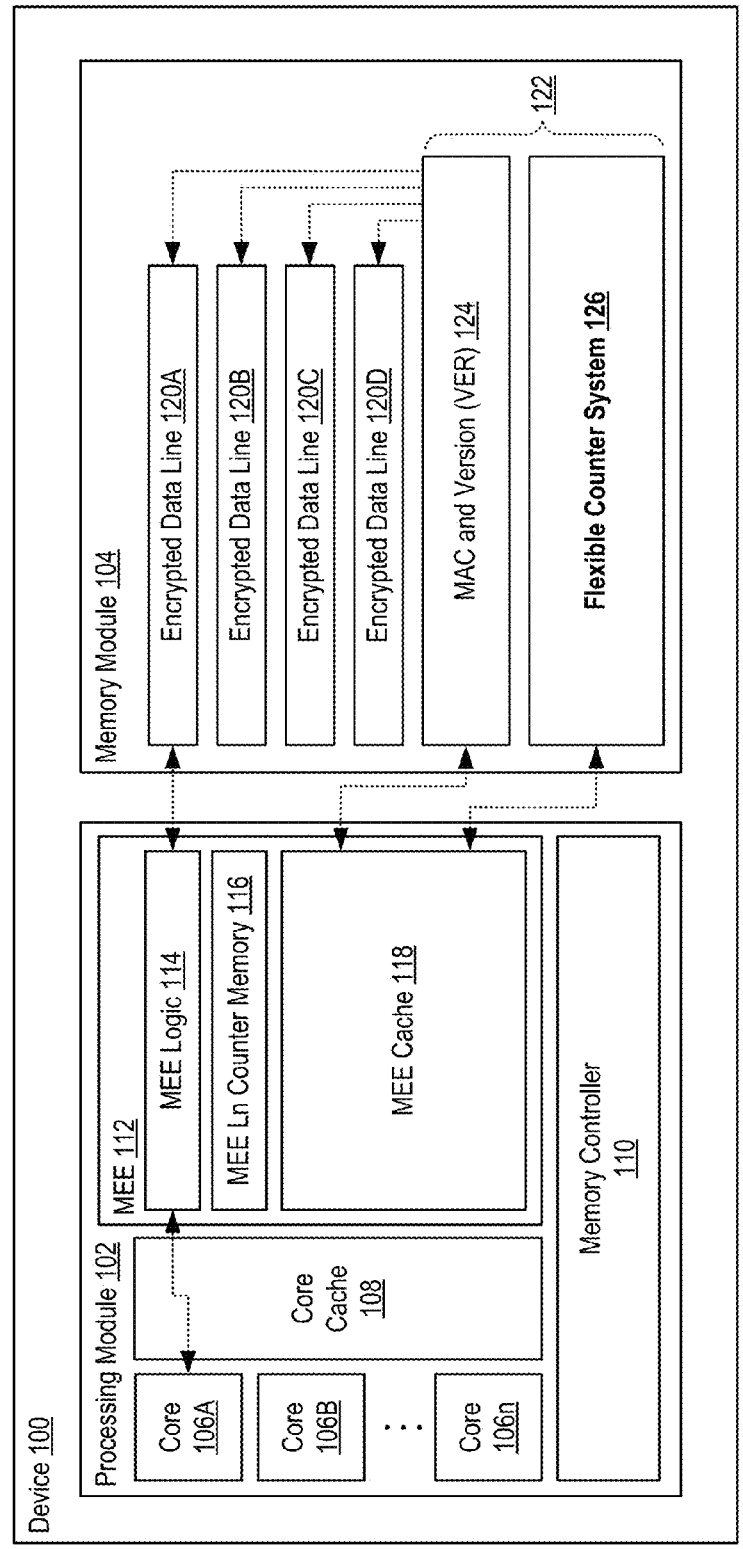
FIG. 1 illustrates an example device including a flexible counter system for memory protection in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a flexible counter system for memory protection. In general, a counter system for supporting memory protection operations in a device may be made more efficient, at least in regard to memory consumption, utilizing flexible counter structures. A device may comprise, for example, a processing module and a memory module. The processing module may include a memory encryption engine (MEE) to decrypt encrypted data loaded from the memory module, or to encrypt plaintext data prior to storage in the memory module, utilizing security metadata including at least counter data generated by a flexible counter system residing at least partially in the memory module. The flexible counter system may comprise at least one data line including a plurality of counters. The bit-size of the counters may be reduced and/or varied from existing implementations through overflow counter that accounts for smaller counters entering an overflow state. Counters that utilize the overflow counter may be identified using a bit indicator. In at least one embodiment, selectors corresponding to each of the plurality of counters may be able to flexibly map particular lower level data lines or memory locations to particular counters (e.g., map very active lower-level data lines or memory locations to larger counters, map less active lower-level data lines or memory locations to smaller counters, etc.).

In at least one embodiment, a device including memory protection may comprise, for example, a memory module and a processing module. The memory module may include at least a flexible counter system. The processing module may include at least a memory encryption engine (MEE) to at least one of decrypt encrypted data loaded from the memory module using security metadata generated at least in part by the flexible counter system or encrypt plaintext data prior to storage in the memory module using the security metadata.

In at least one embodiment, the flexible counter system may comprise at least one data line stored in the memory module, the at least one data line including a plurality of counters. The security metadata may comprise at least counter values generated by the flexible counter system. In an example implementation, a size of each counter may be determined based on a number of bits, and the size of at least some of the counters in the plurality of counters may not be the same. The plurality of counters may comprise groups of counters with the size of the counters in each subsequent group of counters gradually decreasing.

In at least one embodiment, the plurality of counters may comprise at least one overflow counter. The MEE may then be to determine if a counter in the plurality of counters is in an overflow state and determine a counter value by combining a current value of the overflow counter and a current value of the counter when the counter is determined to be in an overflow state. The at least one data line may further comprise bits corresponding to each of the plurality of counters, a state of each bit indicating whether the corresponding counter is in an overflow state.

In the same or a different embodiment, the at least one data line may comprise a selector corresponding to each of the plurality of counters. Each selector may be to, for example, map the corresponding counter in the plurality of counters to a lower-level data line or a location for storing encrypted data in the memory module. The MEE may then be to determine whether a current value of any of the plurality of counters is at or above a threshold value and cause selectors to remap lower-level data lines or locations for storing encrypted data in the memory module from counters in the plurality of counters determined to have current values at or above the threshold value to larger-sized counters in the plurality of counters. Consistent with the present disclosure, an example method for memory protection may comprise receiving a request to encrypt plaintext data prior to storage in a memory module, loading data lines corresponding to the request from a flexible counter system in the memory module, each of the data lines comprising a plurality of counters, determining for each loaded data line whether reconfiguration of the loaded data line is required to generate an incremented value for a counter in the loaded data line, reconfiguring the loaded data line if determined to be required, encrypting the plaintext data using data based on the incremented counter values and storing the encrypted data in memory.

FIG. 1 illustrates an example device including a flexible counter system for memory protection in accordance with at least one embodiment of the present disclosure. Initially, in describing various embodiments consistent with the present disclosure reference may be made to technologies such as Software Guard Extensions (SGX) developed by the Intel Corporation, the components that may make up SGX and the manner in which SGX may operate. SGX has been employed herein to provide a readily comprehensible perspective for understanding the various disclosed embodiments, and is not intended to limit implementations to only employing SGX. Moreover, as referenced herein "memory protection" may generally comprise protecting the confidentiality of data via encryption, integrity protection and/or replay protection. Integrity protection may defend against attacks wherein, for example, an attacker may modify encrypted data in the memory module prior to decryption. Replay protection may prevent attacks wherein, for example, an attacker causes a decryption operation to be repeated to gain unauthorized access to protected data. The above concepts will be discussed in more detail in regard to FIGS. 3 and 4.

An example configuration for device 100 is disclosed in FIG. 1. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Example device 100 may comprise at least processing module 102 and memory module 104. In general, processing module 102 may receive data to process from memory module 104, and may return processed data to memory module 104. In at least one embodiment, the data in memory module 104 may be protected. In one example implementation, device 100 may utilize SGX to protect at least a portion of memory module 104. SGX may provide a secure, hardware-encrypted computation and storage area within system memory, the contents of which cannot be deciphered by privileged code or even through applying hardware probes to memory bus. When memory module 104 is protected by SGX it is impossible for intruders to read the contents of the secure area. Protected data cannot be observed outside of SGX, and thus, is inaccessible outside of SGX. In particular, the identity of programs (e.g., based on cryptographic hash measurements of each program's contents) may be signed and stored inside each program. When the programs are then loaded, processing module 102 may verify that a current measurement of the program is identical to a measurement previously embedded inside the program. The signature used to sign the embedded measurement is also verifiable because processing module 102 may be provided with a public key used to verify the signature at program load time. Malware cannot tamper with a protected program because its measurement would also be altered. Malware also cannot spoof the signature because the signing key is secure with the program's author. The elements that will be described below with respect to processing module 102 and memory module 104 may be used to implement security technology like SGX in device 100. However, consistent with the present disclosure, other security technologies existing now or developed in the future may also be used.

As illustrated in FIG. 1, processing module 102 may comprise, for example, at least one processing core 106 (e.g., core 106A, core 106B . . . core 106n, collectively, "cores 106A . . . n"), core cache 108, memory controller 110 and MEE 112. Cores 106A . . . n may perform various data processing operations that may utilize data stored in core cache 108. As referenced herein, a "cache" may comprise local volatile memory to hold data that may be utilized during a data processing operation. In at least one embodiment, Core cache 108 may comprise a plurality of separate memory areas organized in levels with the outmost level (e.g., from which data may be transmitted to, and received from, MEE logic 114) being the last level cache (LLC). Core cache 108 may help to expedite data processing by avoiding having to repeatedly retrieve data that may be used more than once during a data processing operation from memory module 104. Memory controller 110 may control how processing module 102 may access memory module 104, including reading data from memory module 104 and writing data to memory module 104.

MEE 112 may comprise, for example, MEE logic 114 to perform memory protection operations, MEE Ln counter memory 116 to hold top-level counter data and MEE cache 118 to hold security metadata 126 at least during memory protection operations. In general, security metadata 126 may comprise data utilized in support of memory protection operations. For example, consistent with the present disclosure core 106A may perform data processing operations requiring data secured by a protection system such as SGX. Protected data such as encrypted data line 120A, encrypted data line 120B, encrypted data line 120C and encrypted data line 120D (collectively, "encrypted data lines 120A . . . D") in memory module 104 may be retrieved by MEE logic 114 and decrypted prior to being provided to core 106A. FIG. 1 shows only four encrypted data lines 120A . . . D corresponding to VER and MAC data in a single data line 128, however, the actual number of encrypted data lines 120A . . . D in memory module 104 may depend on a variety of factors such as, for example, the size of the MEE-protected region in memory module 104. In at least one example implementation, each data line may comprise 64B (Bytes) of data that may be stored in a protected region of memory module 104 comprising 128 MB. Likewise, data generated by core 106A that may be sensitive, confidential, etc. may be provided to MEE logic 114 for encryption prior to storage in memory module 104. In this manner, an attacker monitoring data being exchanged between processing module 102 and memory module 104 may be prevented from determining the content of certain data that may be sensitive, confidential, etc.

In at least one embodiment, MEE logic 114 may employ counter-mode encryption to decrypt encrypted data (e.g., encrypted data lines 120A . . . D) required by cores 106A . . . n, or to encrypt plaintext data generated by cores 106A . . . n, using security metadata 122 stored at least partially in memory module 104. Counter-mode encryption operates by performing an exclusive OR (XOR) between the data to be encrypted or decrypted and a "cryptopad" generated based on a seed. For example:

$$\text{Cryptopad} = AES_k(\text{Seed}) \quad (1)$$

$$\text{Encryption} = \text{Plaintext XOR Cryptopad} \quad (2)$$

Wherein AES is an encryption operation based on the Advanced Encryption Standard and k indicates a key size specifying the number of repetitions of transformation rounds that convert the seed into the cryptopad. The protection offered by counter-mode encryption relies mostly on the uniqueness of the seed. This allows data-related operations to proceed independently of cryptographic operations related to the seed, which may improve the overall memory protection performance in that these operations may occur in parallel. Counter-mode encryption requires that the seed be unique spatially and temporarily. Spatial uniqueness may be derived from the address in memory module 104 to which data may be stored (e.g., encrypted data line 120A) as a component of the seed. Consistent with the present disclosure, temporal uniqueness may be achieved using counter values generated by flexible counter system 126. For example, counters in each data line of flexible counter system 126 may be associated with lower level data lines in a hierarchical counter tree structure, and ultimately with a memory location in memory module 104. Counters in each data line of the tree structure may be incremented prior to storing data in the corresponding memory location. The lowest level counter value corresponding to a data line (e.g., encrypted data line 120A) that is being written to memory module 104 may be deemed a "version" (VER) of the data. The values of the counters in the higher levels of the tree structure may be usable to verify the integrity of the VER data line when encrypted data line 120A is later loaded from memory module 104 into processing module 102. Memory authentication code (MAC)/VER data 124 and flexible counter system 126 are generally referenced herein as security metadata 122. During encryption and/or decryption operations, MEE logic 114 may cause at least some of security metadata 122 to be loaded into MEE cache 118 for use in cryptographic operations (e.g., along with data stored in MEE LN counter memory 114). The composition and structure of flexible counter system 126 will be described in more detail in regard to FIG. 3-5.

Figure 2:
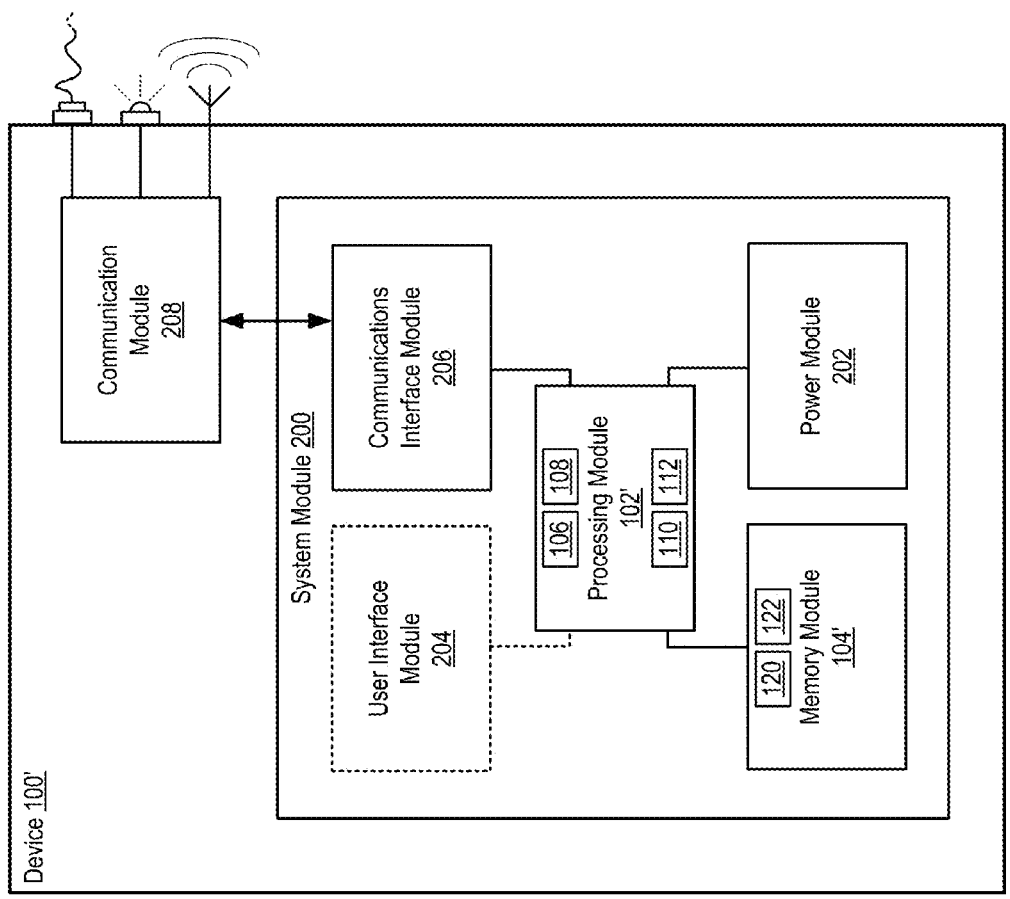
FIG. 2 illustrates an example configuration for a device usable in accordance with at least one embodiment of the present disclosure.

FIG. 2 illustrates an example configuration for a device usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented herein only as an example of an apparatus usable in embodiments consistent with the present disclosure, and is not intended to limit any of the various embodiments to any particular manner of implementation.

Device 100' may comprise, for example, system module 200 to manage operation of the device. System module 200 may include, for example, processing module 102', memory module 104', power module 202, user interface module 204 and communication interface module 206. Device 100' may further include communication module 208. While communication module 208 is illustrated as separate from system module 200, the example configuration shown in FIG. 2 has been provided merely for the sake of explanation. Some or all of the functionality associated with communication module 208 may also be incorporated into system module 200.

In device 100', processing module 102' may comprise one or more processors situated in separate components, or alternatively one or more cores 106A . . . n in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation). As shown in FIG. 2, processing module 102' may comprise at least cores 106A . . . n, core cache 108, memory controller 110, and MEE 112.

Processing module 102' may be configured to execute various instructions in device 100'. Instructions may include program code configured to cause processing module 102' to perform activities related to reading data, writing data, processing data, formulating data, converting data, transforming data, etc. Information (e.g., instructions, data, etc.) may be stored in memory module 104'. Memory module 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. As shown in FIG. 2, memory module 104' may comprise at least encrypted data lines 120A . . . D and security metadata 122 (e.g., MAC and VER data 124 and flexible counter system 126).

Power module 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 204 may be incorporated within device 100' and/or may be coupled to device 100' via a wired or wireless communication medium. User interface module 204 may be optional in certain circumstances such as, for example, a situation wherein device 100' is a server (e.g., rack server, blade server, etc.) that does not include user interface module 204, and instead relies on another device (e.g., a management terminal) for user interface functionality.

Communication interface module 206 may be configured to manage packet routing and other control functions for communication module 208, which may include resources configured to support wired and/or wireless communications. In some instances, device 100' may comprise more than one communication module 208 (e.g., including separate physical interface modules for wired protocols and/or wireless radios) managed by a centralized communication interface module 206. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 206 may be configured to prevent wireless communications that are active in communication module 208 from interfering with each other. In performing this function, communication interface module 206 may schedule activities for communication module 208 based on, for example, the relative priority of messages awaiting transmission. While the embodiment disclosed in FIG. 2 illustrates communication interface module 206 being separate from communication module 208, it may also be possible for the functionality of communication interface module 206 and communication module 208 to be incorporated into the same module.

Figure 3:
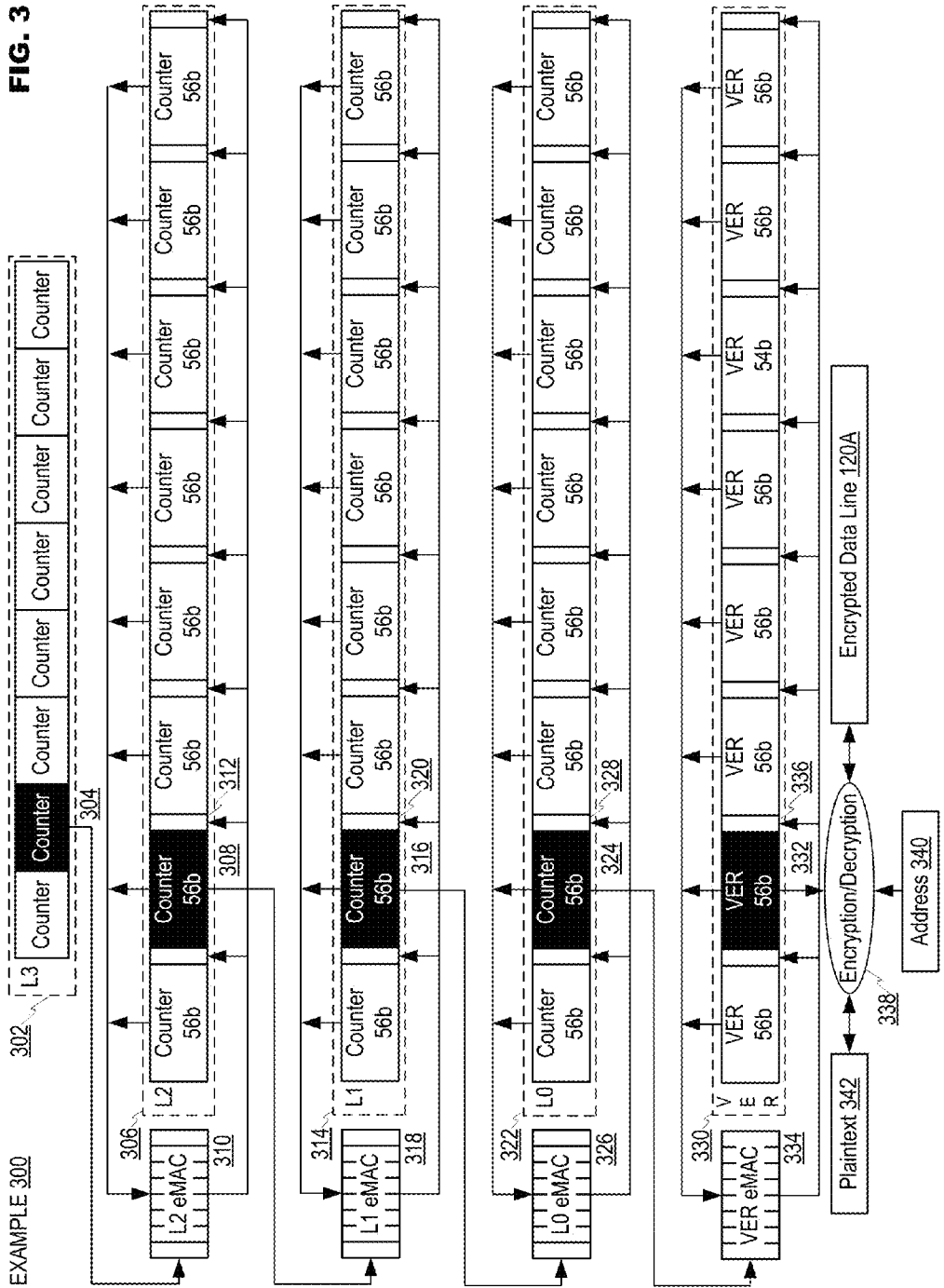
FIG. 3 illustrates an example structure for a counter system in accordance with at least one embodiment of the present disclosure.

FIG. 3 illustrates an example structure for a counter system in accordance with at least one embodiment of the present disclosure. As previously discussed, temporal uniqueness may be based on a chain of counters each associated with a hierarchy of data lines. In at least one embodiment, the lowest level counter may then be associated with a location (e.g., address) in memory module 104 to which an encrypted cache line will be written, wherein the counters are incremented on each write to the memory location. The counters may be used to formulate a VER for the data line for providing replay protection. Security is maintained while the value of the counter can continue to increase. Thus, it is important for the counter to be large enough to prevent an overflow, wherein the counter reaches its maximum value, in its foreseeable lifetime. Once the counter overflows, temporal uniqueness no longer exists and an attacker may "replay" encrypted data lines 120A . . . D on the same address. For example, since the seed is no longer changing based on the temporal uniqueness provided by the counter, security metadata 122 from a prior encryption operation may be used to replay (e.g., decrypt) encrypted data lines 120A . . . D.

An example counter structure is illustrated at 300 in FIG. 3. Example counter structure 300 may comprise a hierarchy of data lines including, for example, L3 302, L2 306, L1 314, L0 322 and VER 330. L3 data line 302 may comprise top-level counters (TLC) stored in MEE Ln counter memory 116 within processing module 102, and thus, may be guaranteed to be safe. L3 data line 302 may comprise a plurality of counters that each correspond to a lower-level data line (e.g., at the L2 level). Each L3 counters may "protect" an L2 data lines from being modified in memory module 104 because L2 eMAC 310 cannot be recalculated without knowing the value of L3 counter 304. Likewise data line L2 306 may comprise a plurality of counters that each protect a lower level data line (e.g., at the L1 level) as in the instance of L3 data line 302, L1 data line 314 may comprise a plurality of counters that each protect an L0 data line, and L0 data line 322 may comprise a plurality of counters that each correspond to a VER line. Each of the VER counters may correspond to a location in memory module 104 in which encrypted data 120A . . . D is stored. The size of each counter may be determined in bits such as, for example, 56b. Data line L2 306 may also include embedded MAC (eMAC) 310. In at least one embodiment, eMAC 310 may be embedded by distributing portions of eMAC 310 between the plurality of counters as shown at 312. Likewise, L1 data line 314 may further comprise eMAC 318 distributed between the plurality of counters as shown at 320, L0 data line 322 may further comprise eMAC 326 distributed between the plurality of counters as shown at 328, and VER data line 330 may comprise eMAC 334 distributed between the plurality of counters as shown at 336. While eMACs 310, 318, 326 and 334 are illustrated at 312, 320, 328 and 336 as being distributed between the plurality of counters in data lines 306, 314, 322 and 330, respectively, this is merely an example of how eMACs may be embedded. Other configurations (e.g., contiguously at the beginning, middle or end of the data line) may be possible consistent with the present disclosure.

In an example of operation, counters 304, 308, 316 and 324 may each correspond to lower-level data lines L2 306, L1 314, L0 322 and VER 330, respectively. These counters may be used formulate eMACs 310, 318, 326 and 334 for protecting these data lines. VER data line 330 includes VER 332, which may be utilized in encryption of plaintext data 342 and decryption of encrypted data line 120. For example, L2 eMAC 310 may be calculated using a cryptographic operation based on the current values of the counters in L2 data line 306 and the value of counter 304 in the immediately preceding L3 data line 302. eMAC 310 may then be distributed into L2 data line 306 as shown at 312. The cryptographic operations will be explained further in FIG. 4. These operations may then repeat for each subsequent data line. For example, L1 eMAC 318 may be calculated over the current values of the counters in L1 data line 314 in combination with the current value of counter 308, L0 eMAC 326 may be calculated over the current values of the counters in L0 data line 322 in combination with the current value of counter 316, and VER eMAC 334 may be calculated over the current values of the counters in VER data line 330 in combination with the current value of counter 332. VER 332 and address 340, corresponding to the location (e.g., address) in memory module 104 wherein encrypted data line 120A is stored, may then be used in encryption/decryption operations 338 to encrypt plaintext data 342 into encrypted data line 120A and to decrypt encrypted data line 120A into plaintext data 342.

Figure 4:
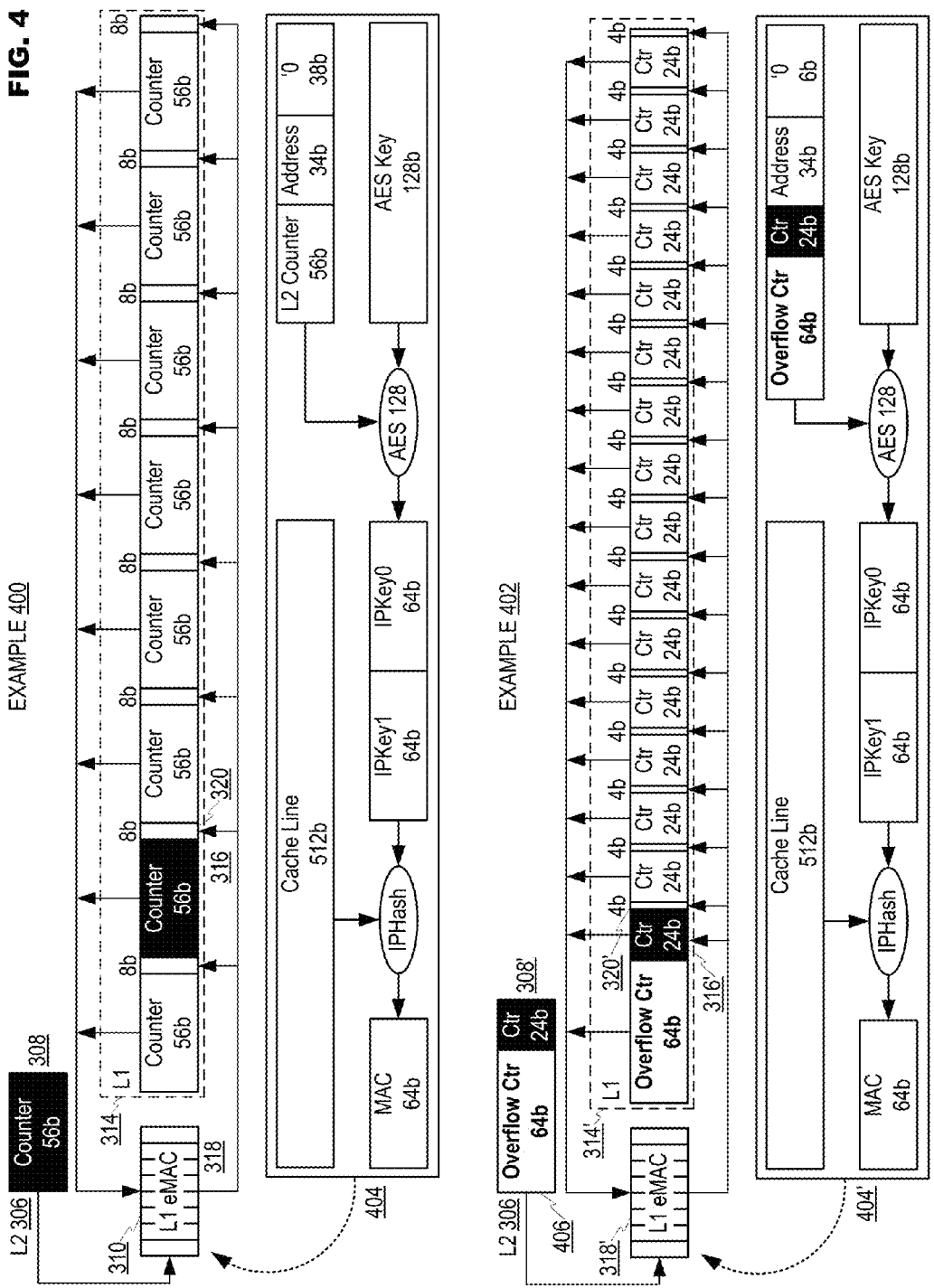
FIG. 4 illustrates example operations for calculating an embedded memory authentication code for the counter system structure illustrated in FIG. 3 and also for a flexible counter structure in accordance with at least one embodiment of the present disclosure.

FIG. 4 illustrates example operations for calculating an embedded memory authentication code for the counter system structure illustrated in FIG. 3 and also for a flexible counter structure in accordance with at least one embodiment of the present disclosure. While the benefits of large counters are apparent (e.g., that overflow may be prevented in the foreseeable lifetime of device 100), making the counters too large may cause different problems. The efficiency of the counter organization is very important in MEE implementation as counter structures such as illustrated in example 300 may result in 25% space overheads. This works well when the protected memory size is 128 MB as may be typical in existing implementations. However, future implementations may be extended to servers that may include large footprint applications. For example, given an implementation with 192 gigabytes (GB) of protected memory in memory module 104, 48 GB of memory module 104 would have to be reserved just for security metadata 122. Sacrificing 48 GB for security metadata 122 is impractical, and may make implementing protective systems such as SGX on large-scale platforms prohibitive. Furthermore, some operating systems (e.g., Microsoft Windows) have placed requirements on how much memory may be commandeered from the OS. If more memory is reserved than what is allowed by the OS manufacturer, obtaining hardware certification from, for example, Windows Hardware Quality Labs (WHQL) may be improbable.

Consistent with the present disclosure, the memory space required for security metadata 122 may be substantially reduced (e.g., by 50%). Better performance may be realized due to, for example, the ability to incorporate more counters with the same amount of memory accesses. In addition to the efficient counter organization, minimizing the impact of overflow prevention on data processing performance is also important. An adaptive mechanism may minimize storage overhead, and at the same time, ensure that reduced memory consumption does not come at the cost of increased data processing burden for device 100.

Examples 400 and 402 are illustrated in FIG. 4. Example 400 discloses how MAC 310 is calculated based on the counter structure of example 300. Moving from right to left in example cryptographic operation 404, AES 128b encryption may generate a 128B key value (e.g., IPKey1 and IPKey0 each including 64 b) based on a 128b AES key and another 128b input comprising the current value of counter 306 at 56b, a 34b address (e.g., corresponding to a memory location where the data will be stored in memory module 104) and 38b of zero padding ('0). The 128b key resulting from AES encryption and the current values of the counters in L1 data line 314 (e.g., totaling 512b) may then be hashed (e.g., may be combined and a value may be calculated based on the contents of combined data) to generate a 64b MAC. In example 400, the calculated MAC may be LE eMAC 318, which may then be distributed into L1 data line 314 as shown at 320. The same process may also be used for verification when encrypted data (e.g., encrypted data line 120A) is loaded from memory module 104. A "tree walk" may be performed starting from the VER level and going up to the L3 level, wherein a new MAC may be calculated for each data line and compared to the eMAC to see if the data line has changed since it was saved. The newly calculated MAC not matching the eMAC indicates that the data line was changed in memory module 104, possibly due to an attack. Discontinuity determined during the tree walk may trigger a security exception in device 100 to protect the device from being compromised.

Example 402 shows a modified counter structure consistent with the present disclosure. In particular, the counters in L1 data line 314' have been reduced in size from L1 data line 314, and overflow counter 405 has been added. Counter 316' is reduced to 24b in example 402. This means that L1 data line 314' may comprise twice as many counters as L1 data line 314, and thus, may account for twice as many locations in memory module 104 to store encrypted data lines 120A . . . D. However, since the counters in L1 data line 314' are less than half the size of the counters in L1 data line 314, they will overflow twice as quickly (depending on the activity for the memory location with which they are associated). Overflow counter 314' may account for this situation by being combined with any counter that is in an overflow state. For example, if counter 306' in example 402 is in an overflow state, then when cryptographic operation 404' is performed the input to AES 128 may comprise a 64b current value from overflow counter 406, a 24b current value from counter 308' (the counter from the previous level), a 34b address and 6b of zero-padding. In at least one embodiment, counters that overflow (e.g., counter 308') may reset and start counting again after it utilizes overflow counter 406. This means that overflow counter 406 may only increment once for each time a counter in L1 data line 314' overflows.

Moreover, by packing more counters into each counter line (e.g., L1 data line 314') MEE 112 may operate with a reduced-height replay-protection tree given the same sized on-chip TLC. For example, existing implementations of protection systems like SGX may employ a five level replay protection tree including version (Version, L0, L1, L2 and L3). Using 24 bit counters and the various mechanisms disclosed herein, MEE 112 may be able to reduce the replay tree to have 4 levels (Version, L0, L1 and L2 stored in processing module 112). This reduction in levels may enable MEE 112 to have to traverse fewer levels during cryptographic tree walks for encryption or decryption. It has been observed through simulation that eliminating a level of the replay tree may substantially reduce the performance impact caused by the cryptographic mechanisms of MEE 112 (e.g., by 11.8%). In addition to improved performance, the space in memory module 104 required for the counters may be reduced by 50%, which may resolves the metadata space overhead issues associated with the future usage of protection systems (e.g., SGX).

Figure 5:
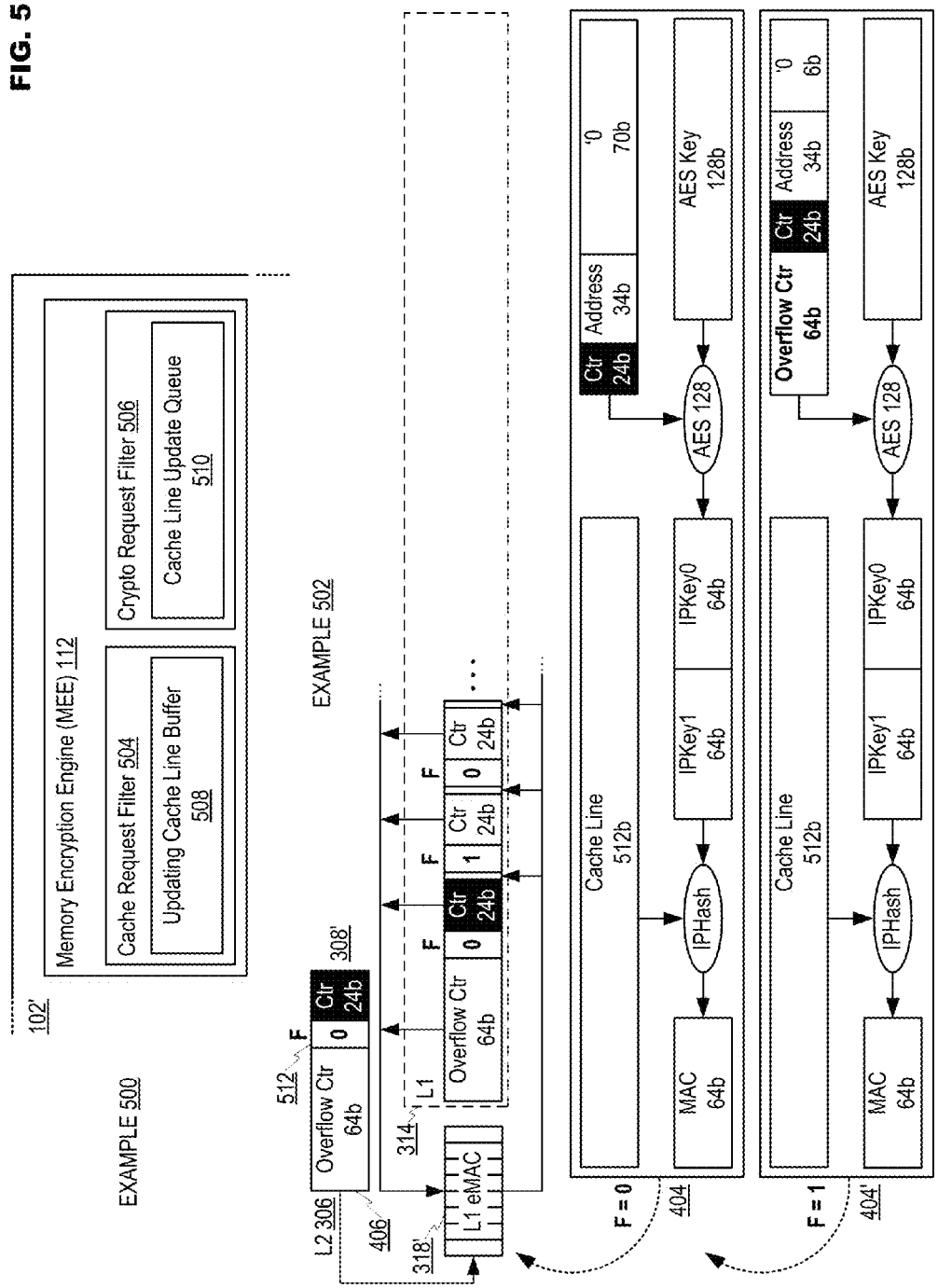
FIG. 5 illustrates an example configuration for a memory encryption engine and an example structure for a flexible counter including an overflow indication system in accordance with at least one embodiment of the present disclosure.

FIG. 5 illustrates an example configuration for a memory encryption engine and an example structure for a flexible counter including an overflow indication system in accordance with at least one embodiment of the present disclosure. Two examples are illustrated in FIG. 5 to demonstrate architectural changes that may be implemented to support counters structures that include overflow features such as disclosed in example 402. At least one issue that may arise from the introduction of overflow counter 406 is that whenever overflow counter 406 is updated (e.g., overflow counter 406 in L2 data line 306' may be incremented when counter 308' enters the overflow state), all lower-level eMACs that rely upon the values of counters in the data line must also be updated. For example, when counter 406 increments L1 eMAC 318' must be updated along with any other L1 level data line that relies on one of the sixteen counters in L2 data line 306' (not shown) for computing their respective eMAC. As referenced herein, this type of update is termed a bulk update. To allow for efficient bulk update, MEE 112 may be modified such as set forth in example 500. For example, MEE 112 may be modified to include cache request filter 504 and crypto request filter 506. For cache accesses, access to the metadata cache lines that are regenerating eMACs should be blocked because these values are in flux. The access should only be allowed once the bulk update is completed. This may be done by maintaining the address of a currently updating data line in updating cache line buffer 508 which may be, for example, a register, local memory, etc. In an example of operation, updating cache line buffer 508 may be compared with incoming data line access requests to block incoming accesses until the update of the data line is complete. For cryptographic-related accesses, we may add a simple cache line update queue 510, which may be a register or local memory that holds AES operations generated by a bulk eMAC update or data re-encryptions caused by updating overflow counter 406. Cryptographic requests may now check whether there are pending requests in cache line update queue 510 before accessing the AES logic. To prevent potential deadlocks, requests from cache line update queue 510 may have higher priority over incoming crypto requests.

Example 502 illustrates a bit-based flag system that may help to reduce the amount of cryptographic data re-processing required for bulk updates that are caused by overflow counter usage. With the introduction of overflow counter 406 into the basic counter structure, whenever overflow counter 406 is incremented in a data line it must be assumed that all of the counters in the same data line have changed due to their possible reliance on overflow counter 406, and thus, all of the eMACs based on these possibly updated counters in the data line must be recalculated. This forced assumption may result in a wasted expenditure of valuable data processing capacity as possibly only one or a few of the counters in the data line may actually be relying on overflow counter 406 when it was incremented. This effect is exacerbated by the fact that in the proposed counter structure of example 402 L2 data line 314' comprises counters that may correspond to sixteen (16) different data lines, which may be the epicenter of a ripple effect of wasted bulk eMAC re-processing. To counter this effect, in example 502, a flag "F" 512 is introduced corresponding to each counter to indicate the counters that are currently relying upon overflow counter 406. Instead of concatenating overflow counter 406 with every counter in the data line unconditionally, flag 512 may provide a selective overflow counter mechanism that checks the overflow indicator 512 first. As shown in example 502, flag 512=0 it may indicate that the corresponding counter 318' has not entered into an overflow state, and thus there is no need to use overflow counter in the cryptographic operations as counter 308' itself is enough to provide temporal uniqueness. Given a 128b AES operation, 70b of 0-padding is utilized instead of 64-bit overflow counter 406. If flag 512=1, as shown at 404' overflow counter 406 may be employed in the cryptographic operation to provide temporal uniqueness for the overflowed counter 308'.

The benefit of selectively using the overflow counter in cryptographic seed may include a reduction in data processing overhead. For example, when an overflow happens and bulk eMAC updates occur or data line re-encryption and re-calculation of MAC happen, cache line counters with F=0 do not need to update their eMAC or re-encrypt data as overflow counter 406 was not utilized in computing subsequent eMACs based on the counter. For example, if only one counter in a data line was using overflow counter 406 when it is incremented (e.g., counter 308 in data line L2 306), then only one flag (e.g., F 512) would be set to "1" during bulk updates, and only the eMAC for the L1 data line that relies on counter 308' for temporal uniqueness (e.g. L1 data line 314) would require reformulation to account for overflow counter 406 being incremented. This may greatly reduce the impact on performance for overflow counter-related bulk updates.

Figure 6:
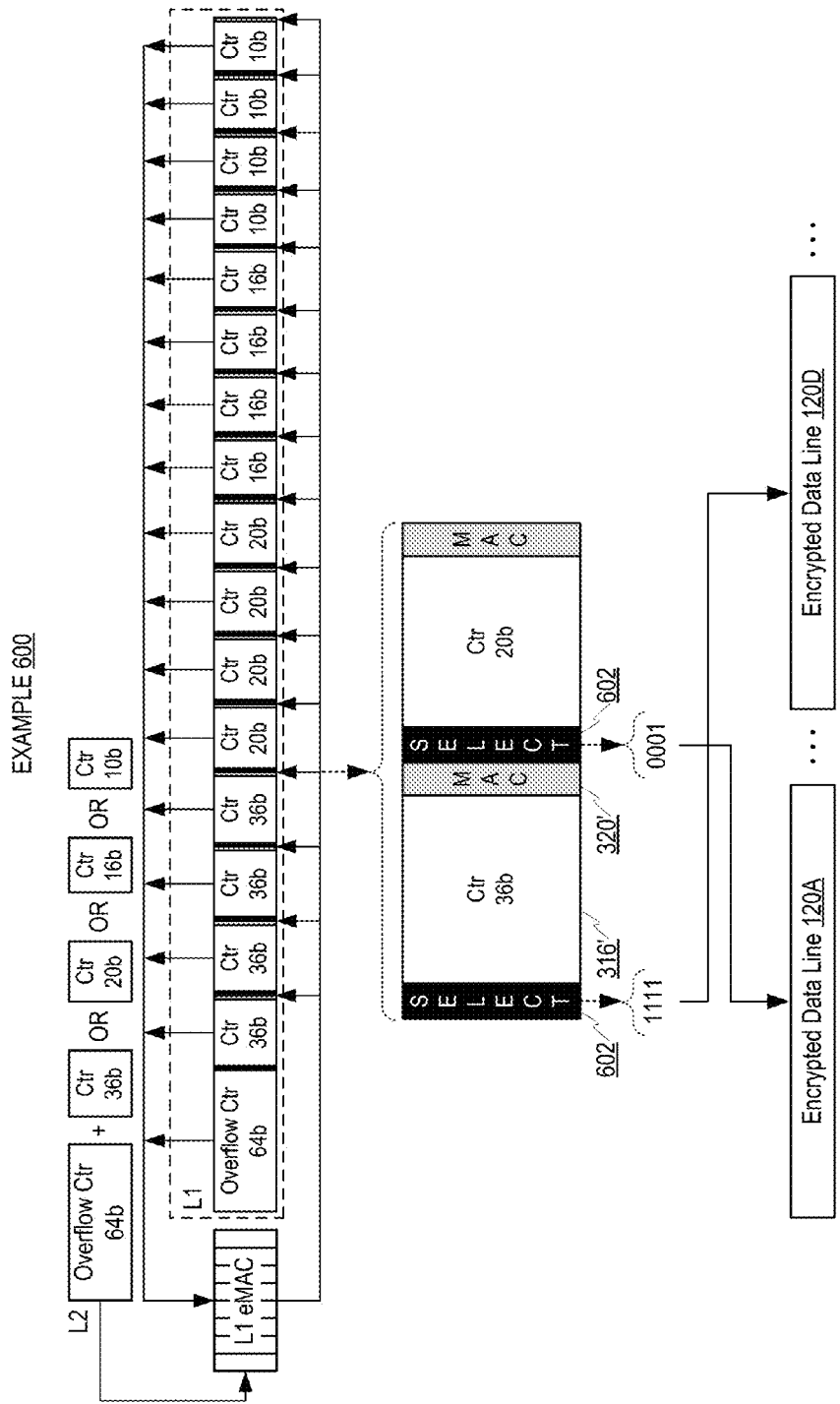
FIG. 6 illustrates an example flexible counter structure comprising selection functionality in accordance with at least one embodiment of the present disclosure.

FIG. 6 illustrates an example flexible counter structure comprising selection functionality in accordance with at least one embodiment of the present disclosure. Although the probability of counter overflows may be low even with reduced-size counters such as illustrated in example 402, each overflow may degrade performance as it causes overflow counter 406 to increment, and as a result, bulk eMAC updates may be triggered (e.g., and/or multiple data re-encryption along with MAC updates if the overflow happens at VER level). This overflow becomes more problematic in SoC products without a large LLC as the off-chip accesses tend to have a locality. With the locality in the data traffic pattern, some data blocks (e.g., "hot" data blocks) may be accessed more frequently than others, which may cause a corresponding counter to overflow much sooner than expected (even if the average counter value across the data line remains low). To avoid unexpected counter overflows and performance degradation caused by the hot blocks, an adaptive counter mapping system may be introduced to manage counter mappings between associated data block in a way that may reduce overflows. With the adaptive mapping, counter sizes are not equal any more. Instead, some counters are larger than others. Example 600 shows one possible arrangement of counter sizes. Here, instead of sixteen (16) 24-bit counters depicted in example 402, each metadata cache line holds four (4) 36-bit counters, four (4) 20-bit counters, four (4) 16-bit counters and four (4) 10-bit counters. The counter arrangement illustrated in FIG. 6 is an example of how counters may be arranged for explanation purposes, and is not intended to limit the various embodiments disclosed herein to any particular manner of implementation.

In addition to the various sized counters shown in example 600, each of the counters may be augmented with selector 602 (e.g., 4-bit) that may point any data cache line in the lower level. The linkage between counters and an associated data cache line may be set dynamically based on the frequency of the counter update. This is demonstrated in example 600 wherein the previous level L2 counter may comprise the overflow counter concatenated with any of the four sizes of counter. Example 600 shows an example wherein two counters with different sizes point to two different encrypted data lines (e.g., stored in particular locations in memory module 104). Here, encrypted data line 120D is more frequently accessed, and thus, the larger counter (36 bit counter 316') is assigned, while encrypted data line 120A is assigned to the smaller (20 bit) counter as it is updated less frequently. Assigning the 20b counter to encrypted data line 120A may help to prevent the 20b counter from overflowing too quickly (or at all).

In an example of operation, selectors 602 may be initialized from 0 to n−1, where n is the number of counters in a cache line. In example 600, selectors 602 may be initialized from 0 to 15. From initialization, counter 0, 1, 2 . . . may point to cache line 0, 1, 2 . . . . This mapping may be identical to the mapping without the adaptive counter mapping. As the system operates, data blocks may be written to, and thus, counters are being incremented. On each counter update, the counter value may be checked as to whether it is close to overflow. One possible way to verify the counter status is to set a threshold that indicates when the counter is getting close to entering the overflow state. For example, if the counter value plus the threshold exceeds the maximum value of the counter, then remapping of the counter may be necessary. If a counter is determined to be close to overflow (e.g., based on the threshold value) adaptive mapping may promote the data line to a larger counter. Promotion may include, for example, searching counters with the next larger size to find the next-larger sized counter with the smallest value. For example, if the value of a 10-bit counter is at or over the threshold value, a search may be performed to find the 16-bit counter with the smallest value. If the smallest value of the next-larger sized counter is determined to be less that the counter value about to overflow, the two counters may be swapped. This swap may include, for example, both counter values and selector pointers. From the above operations, more frequently updated encrypted data lines 120A . . . D may be promoted to larger-sized counters and less-frequently updated encrypted data lines 120A . . . D may gradually gravitate to smaller-sized counters, allowing the system to allocate resources based on counter size and to minimize the occurrence of counter overflows and data related processing overhead.

Figure 7:
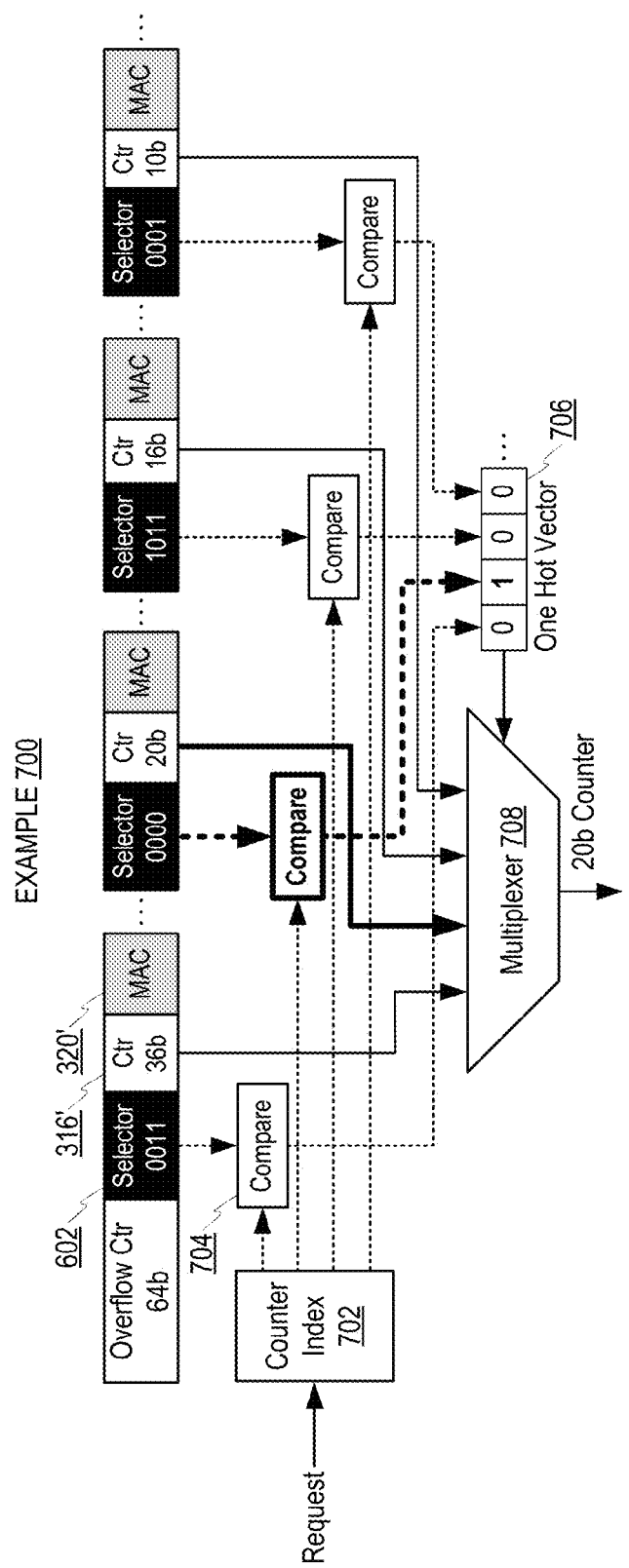
FIG. 7 illustrates an example configuration to support selection functionality in a flexible counter system in accordance with at least one embodiment of the present disclosure.

FIG. 7 illustrates an example configuration to support selection functionality in a flexible counter system in accordance with at least one embodiment of the present disclosure. With the adaptive counter mapping, mappings between counters and corresponding lower-level data lines or memory locations in memory module 104 are no longer static. Therefore, logic may be used to configure selectors 602 to point to the correct lower-level data lines or memory locations. Example 700 shows one possible implementation of such logic. In this logic, when the request comes counter index 702 is first calculated. Counter index 702 is the index that would be used to locate the counter without the adaptive scheme, and may be easily calculated (e.g., using the address in memory module 104 of the particular encrypted data line 120 A . . . D). Counter index 702 may then be compared with the selectors 602 as illustrated at 704 to find a matching selector 602. This comparison may be parallelized with multiple comparators as the location of selectors 602 may be fixed. The results from one-hot vector 706, as there can be one and only one selector that points to the particular lower-level data line or memory location, may be used to read out the corresponding cache-line counter and provide the input to multiplexer 708. For example, in example 700 the incoming request used to be mapped to the first counter 316' if no adaptive scheme is used. However, with the new mapping logic the index may be compared with sixteen (16) selectors, and a 20-bit counter (e.g., the second counter shown in example 700) is instead mapped to the particular lower-level data line or memory location by multiplexer 708.

Figure 8:
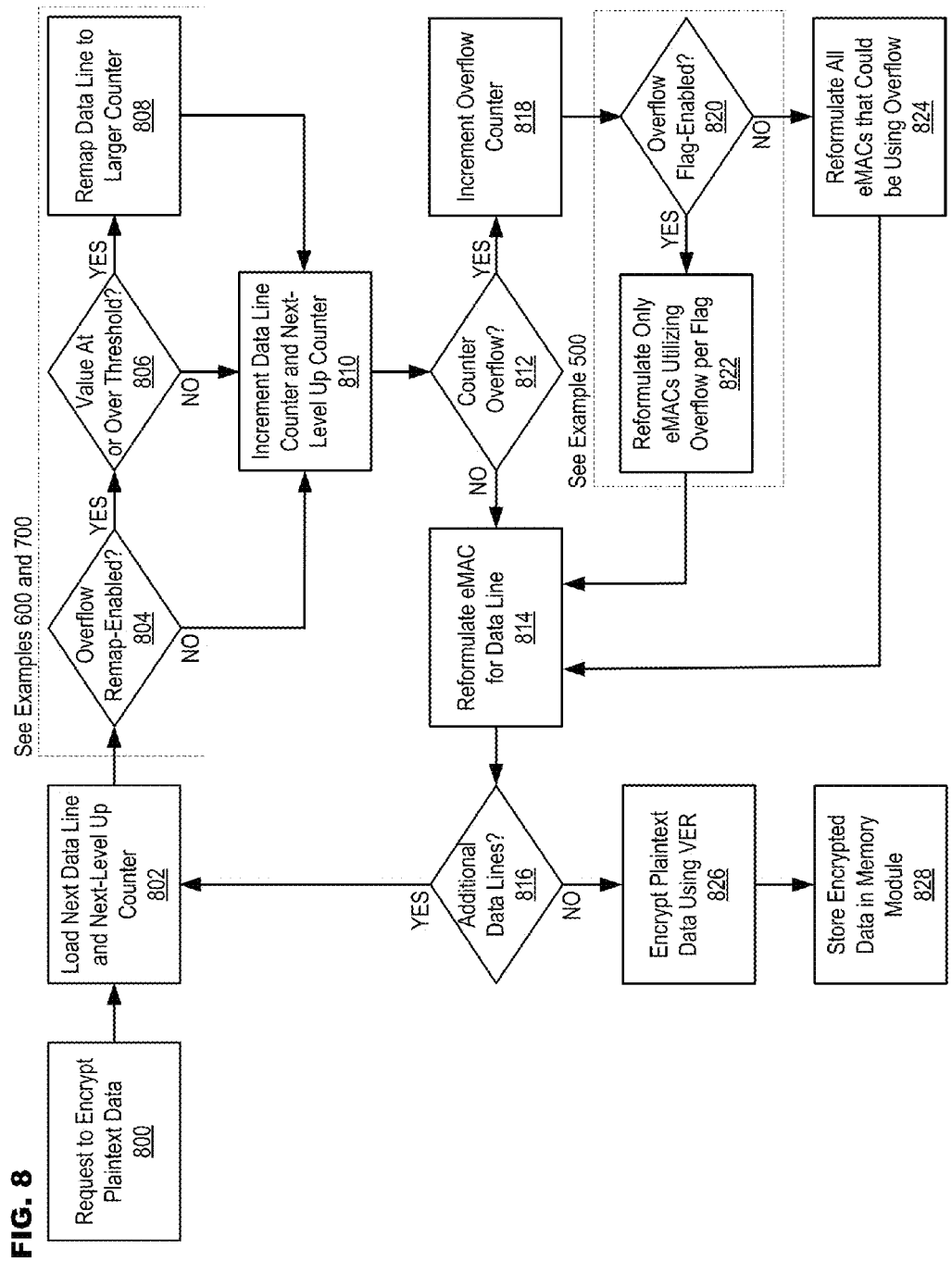
FIG. 8 illustrates example operations for memory protection in accordance with at least one embodiment of the present disclosure.

FIG. 8 illustrates example operations for memory protection in accordance with at least one embodiment of the present disclosure. In operation 800 a request may be received to encrypt plaintext data into encrypted data. The request may be generated by, for example, a processing core in a processing module that also includes a MEE. In operation 802 the next data line may be loaded (e.g., starting with a VER data line including a VER counter corresponding to a memory location where the encrypted data will be written) and the next-level up data line (e.g., starting with the L0 line including a counter corresponding to the VER data line). Operations 804 to 808 may correspond to the example embodiment illustrated in examples 600 and 700. A determination may be made in operation 804 as to whether the counter system is overflow remap-enabled (e.g., whether counters may be remapped to help prevent counter overflow). If in operation 804 it is determined that the system is remap-enabled, then in operation 804 a further determination may be made as to whether the value of the counter in either of the loaded data lines (e.g., the VER counter in the VER data line or the counter corresponding to the VER data line in the L0 data line) is at or above the threshold value. If in operation 806 it is determined that either counter is at or over the threshold value, then in operation 808 remapping may occur (e.g., the memory location may be remapped to a larger counter in the VER data line and/or the VER data line may be remapped to a larger counter in the L0 data line). The counters may then be incremented in operation 810 following a determination in operation 804 that the counter system is not remap-enabled, a determination in operation 806 that neither of the counter values are over the threshold or following counter remapping in operation 808.

A determination may then be made in operation 812 as to whether a counter overflow has occurred. If in operation 812 it is determined that none of the relevant counters have overflowed, then in operation 814 the embedded MAC for the loaded data line (e.g., the VER data line) may be reformulated. A determination may then be made in operation 816 as to whether additional data lines need to be loaded (e.g., L1/L2 and L2/L3). A determination that additional data lines need to be loaded may be followed by a return to operation 802.

Returning to operation 812, if it is determined that at least one counter has overflowed, then in operation 818 an overflow counter in the data line where the counter has overflowed may be incremented. Operations 820 to 822 may correspond to an embodiment illustrated in example 502. A determination may then be made in operation 820 as to whether the system is overflow bit-enabled. If in operation 820 it is determined that the system is overflow bit-enabled, then in operation 822 only the eMACs for lower-level data lines that rely upon a counter that is flagged as utilizing the overflow counter need to be updated. If in operation 820 it is determined that flexible counter system is not flag-enabled, then in operation 824 all of the eMACs for data lines that rely upon counters that could possibly be utilizing the incremented overflow counter (e.g., all counters in the same data line as the incremented overflow counter) may be reformulated. Operations 822 and 824 may be followed by a return to operation 814. If in operation 816 it is determined that no further data lines need to be loaded, then in operation 826 the plaintext data may be encrypted through a cryptographic operation that utilizes as an input at least the VER corresponding to the location in the memory module where the encrypted data will be stored. The encrypted data may then be stored in the memory module in operation 828.

While FIG. 8 illustrates operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a flexible counter system for memory protection. In general, a counter system for supporting memory protection operations in a device may be made more efficient utilizing flexible counter structures. A device may comprise a processing module and a memory module. A flexible counter system in the memory module may comprise at least one data line including a plurality of counters. The bit-size of the counters may be reduced and/or varied from existing implementations through an overflow counter that may account for smaller counters entering an overflow state. Counters that utilize the overflow counter may be identified using a bit indicator. In at least one embodiment selectors corresponding to each of the plurality of counters may be able to map particular memory locations to particular counters.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a flexible counter system for memory protection.

According to example 1 there is provided a device including memory protection. The device may comprise a memory module including at least a flexible counter system and a processing module including at least a memory encryption engine to at least one of decrypt encrypted data loaded from the memory module using security metadata generated at least in part by the flexible counter system, or encrypt plaintext data prior to storage in the memory module using the security metadata.

Example 2 may include the elements of example 1, wherein the flexible counter system comprises at least one data line stored in the memory module, the at least one data line including a plurality of counters.

Example 3 may include the elements of example 2, wherein the security metadata comprises at least counter values generated by the flexible counter system.

Example 4 may include the elements of any of examples 2 to 3, wherein the counter values are loaded into a cache corresponding to the memory encryption engine in the processing module for use in encryption or decryption.

Example 5 may include the elements of example 4, wherein the memory encryption engine comprises at least one of a cache request filter or a crypto request filter.

Example 6 may include the elements of example 5, wherein the cache request filter is to prevent access to data lines in the cache based on an updating cache line buffer.

Example 7 may include the elements of any of examples 5 to 6, wherein the crypto request filter is to prevent cryptographic operations from being performed in data lines in the cache that are queued for update based on a cache line update queue.

Example 8 may include the elements of any of examples 2 to 7, wherein a size of each counter is determined based on a number of bits making up each counter.

Example 9 may include the elements of example 8, wherein the plurality of counters comprises groups of counters with the size of the counters in each subsequent group of counters gradually decreasing.

Example 10 may include the elements of any of examples 2 to 9, wherein the plurality of counters comprises at least one overflow counter.

Example 11 may include the elements of example 10, wherein the data line comprises one 64 bit overflow counter and sixteen 24 bit counters.

Example 12 may include the elements of any of examples 10 to 11, wherein the memory encryption engine is to determine if a counter in the plurality of counters is in an overflow state and determine a counter value by combining a current value of the overflow counter and a current value of the counter when the counter is determined to be in an overflow state.

Example 13 may include the elements of example 12, wherein the at least one data line comprises bits corresponding to each of the plurality of counters, a state of each bit indicating whether the corresponding counter is in an overflow state.

Example 14 may include the elements of any of examples 2 to 13, wherein the at least one data line comprises a selector corresponding to each of the plurality of counters.

Example 15 may include the elements of example 14, wherein each selector is to map the corresponding counter in the plurality of counters to a lower-level data line or a location for storing encrypted data in the memory module.

Example 16 may include the elements of example 15, wherein memory encryption engine is to compare a requested counter index received in a request to counter indexes set in each selector in the at least one data line and control a multiplexer to associate a counter having an index matching the requested index with a corresponding lower-level data line or a location in the memory module.

Example 17 may include the elements of any of examples 15 to 16, wherein the memory encryption engine is to determine whether a current value of any of the plurality of counters is at or above a threshold value and cause selectors to remap lower-level data lines or locations for storing encrypted data in the memory module from counters in the plurality of counters determined to have current values at or above the threshold value to larger-sized counters in the plurality of counters.

Example 18 may include the elements of any of examples 1 to 17, wherein the flexible counter system comprises at least one data line stored in the memory module, the at least one data line including a plurality of counters with a size of each counter determined based on a number of bits making up each counter.

According to example 19 there is provided a method for memory protection. The method may comprise receiving a request to encrypt plaintext data prior to storage in a memory module, loading data lines corresponding to the request from a flexible counter system in the memory module, each of the data lines comprising a plurality of counters, determining for each loaded data line whether reconfiguration of the loaded data line is required to generate an incremented value for a counter in the loaded data line, reconfiguring the loaded data line if determined to be required, encrypting the plaintext data using data based on the incremented counter values and storing the encrypted data in memory.

Example 20 may include the elements of example 19, wherein determining whether reconfiguration of the data line is required comprises determining whether the counter value is at or above a threshold value.

Example 21 may include the elements of example 20, further comprising causing at least one selector in the data line to remap a lower-level data line or memory location currently mapped to the counter determined to be at or above the threshold value to a larger counter in the data line.

Example 22 may include the elements of any of examples 19 to 21, wherein determining whether reconfiguration of the data line is required comprises determining if the counter is in an overflow state, incrementing an overflow counter in the data line based on the counter being determined to be in an overflow state and reformulating embedded memory authentication codes for lower-level data lines using both the overflow counter value and the value of the counter in the overflow state.

Example 23 may include the elements of example 22, and may further comprise setting a bit flag in the data line corresponding to the counter in the overflow state, the bit flag indicating that the value of the overflow counter and the value of the counter in the overflow state were used to reformulate an embedded memory authentication code for a corresponding lower-level data line.

Example 24 may include the elements of example 23, wherein reformulating embedded memory authentication codes for lower-level data lines comprises reformulating embedded memory authentication codes for only lower-level data lines that correspond to counters with a bit flag that is set.

Example 25 may include the elements of example 24, wherein reformulating the embedded memory authentication codes comprises performing a cryptographic operation on a corresponding lower-level data line utilizing as input a concatenated current value of the overflow counter and the current value of the counter determined to be in the overflow state.

Example 26 may include the elements of any of examples 19 to 25, wherein determining whether reconfiguration of the data line is required comprises determining whether the counter value is at or above a threshold value and causing at least one selector in the data line to remap a lower-level data line or memory location currently mapped to the counter determined to be at or above the threshold value to a larger counter in the data line.

According to example 27 there is provided a system including at least a device, the system being arranged to perform the method of any of the above examples 19 to 26.

According to example 28 there is provided a chipset arranged to perform the method of any of the above examples 19 to 26.

According to example 29 there is provided at least one machine readable medium comprising a plurality of instructions that, in response to be being executed on a computing device, cause the computing device to carry out the method according to any of the above examples 19 to 26.

According to example 30 there is provided a device configured for memory protection, the device being arranged to perform the method of any of the above examples 19 to 26.

According to example 31 there is provided a system for memory protection. The system may comprise means for receiving a request to encrypt plaintext data prior to storage in a memory module, means for loading data lines corresponding to the request from a flexible counter system in the memory module, each of the data lines comprising a plurality of counters, means for determining for each loaded data line whether reconfiguration of the loaded data line is required to generate an incremented value for a counter in the loaded data line, means for reconfiguring the loaded data line if determined to be required, means for encrypting the plaintext data using data based on the incremented counter values and means for storing the encrypted data in memory.

Example 32 may include the elements of example 31, wherein the means for determining whether reconfiguration of the data line is required comprise means for determining whether the counter value is at or above a threshold value.

Example 33 may include the elements of example 32, and may further comprise means for causing at least one selector in the data line to remap a lower-level data line or memory location currently mapped to the counter determined to be at or above the threshold value to a larger counter in the data line.

Example 34 may include the elements of any of examples 31 to 33, wherein the means for determining whether reconfiguration of the data line is required comprise means for determining if the counter is in an overflow state and means for incrementing an overflow counter in the data line based on the counter being determined to be in an overflow state and means for reformulating embedded memory authentication codes for lower-level data lines using both the overflow counter value and the value of the counter in the overflow state.

Example 35 may include the elements of example 34, and may further comprise means for setting a bit flag in the data line corresponding to the counter in the overflow state, the bit flag indicating that the value of the overflow counter and the value of the counter in the overflow state were used to reformulate an embedded memory authentication code for a corresponding lower-level data line.

Example 36 may include the elements of example 35, wherein the means for reformulating embedded memory authentication codes for lower-level data lines comprise means for reformulating embedded memory authentication codes for only lower-level data lines that correspond to counters with a bit flag that is set.

Example 37 may include the elements of example 36, wherein the means for reformulating the embedded memory authentication codes comprise means for performing a cryptographic operation on a corresponding lower-level data line utilizing as input a concatenated current value of the overflow counter and the current value of the counter determined to be in the overflow state.

Example 38 may include the elements of any of examples 31 to 37, wherein determining whether reconfiguration of the data line is required comprises determining whether the counter value is at or above a threshold value and causing at least one selector in the data line to remap a lower-level data line or memory location currently mapped to the counter determined to be at or above the threshold value to a larger counter in the data line.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device including memory protection, comprising:
  a memory module comprising a flexible counter system wherein the flexible counter system comprises at least one data line, an overflow counter associated with the at least one data line and a plurality of counters associated with the at least one data line, each one of the plurality of counters comprising a bit flag, wherein each bit flag is configured to indicate whether a corresponding one of said plurality of counters is in an overflow state; and
  a processing module including at least a memory encryption engine to at least one of decrypt encrypted data loaded from the memory module using security metadata generated at least in part by the flexible counter system, or encrypt plaintext data prior to storage in the memory module using the security metadata wherein the memory encryption engine is to: determine if a counter in the plurality of counters is in an overflow state based at least in part on a state of its bit flag; and
  generate said security metadata at least in part by concatenating a current value of the overflow counter and a current value of only at least one counter that is determined to be in an overflow state.

2. The device of claim 1, wherein a size of each counter in the plurality of counters is determined based on a number of bits making up each counter.

3. The device of claim 2, wherein the plurality of counters comprises groups of counters with the size of the counters in each subsequent group of counters gradually decreasing.

4. The device of claim 1, wherein the at least one data line comprises a selector corresponding to each of the plurality of counters, wherein each selector is to map the corresponding counter in the plurality of counters to a lower-level data line or a location for storing encrypted data in the memory module.

5. The device of claim 1, wherein the memory encryption engine is further to:
  determine whether a current counter value of any of the plurality of counters is at or above a threshold value; and
  cause selectors to remap lower-level data lines or locations for storing encrypted data in the memory module from counters in the plurality of counters determined to have current values at or above the threshold value to larger-sized counters in the plurality of counters.

6. The device of claim 1 wherein said concatenating comprises concatenating the current value of only at least one counter in the overflow state with the current value of the overflow counter and an address corresponding to a memory location.

7. A method for memory protection, comprising:
  receiving a request to encrypt plaintext data prior to storage in a memory module;
  loading data lines corresponding to the request from a flexible counter system in the memory module, each of the data lines comprising an overflow counter and a plurality of counters, each of the plurality of counters comprising a bit flag, wherein each bit flag is configured to indicate whether a corresponding one of said plurality of counters is in an overflow state;
  for each loaded data line:
    determining if a counter in the plurality of counters is in an overflow state based at least in part on a state of its bit flag;
    generating security metadata at least in part by concatenating a current value of the overflow counter and a current value of only at least one counter that is determined to be in an overflow state; and
encrypting said plaintext data with a cryptographic operation utilizing said security metadata.

8. The method of claim 7, further comprising:
determining whether reconfiguration of a data line is required at least in part by determining whether a current counter value of any of the plurality of counters in a data line is at or above a threshold value.

9. The method of claim 8, further comprising:
when a current counter value of any of the plurality of counters of a data line is at or above the threshold value, causing at least one selector in the data line to remap a lower-level data line or memory location currently mapped to the counter having a current counter value at or above the threshold value to a larger counter in the data line.

10. The method of claim 7, wherein the bit flag of each of the plurality of counters is further to indicate whether its respective counter relies on said overflow counter.

11. The method of claim 7, further comprising reformulating embedded memory authentication codes for only lower-level data lines that correspond to a counter of said plurality of counters that has a bit flag indicating that the counter is in an overflow state.

12. The method of claim 11, wherein reformulating the embedded memory authentication codes comprises performing a cryptographic operation on a corresponding lower-level data line utilizing as an input a concatenated current value of the overflow counter and a current value of at least one counter determined to be in the overflow state.

13. The method of claim 7 wherein said generating said security metadata at least in part by concatenating comprises concatenating the current value of only at least one counter in the overflow state with the current value of the overflow counter and an address corresponding to a memory location.

14. At least one non-transitory machine-readable storage medium having stored thereon, individually or in combination, instructions for memory protection that, when executed by one or more processors, cause the one or more processors to:
receive a request to encrypt plaintext data prior to storage in a memory module;
load data lines corresponding to the request from a flexible counter system in the memory module, each of the data lines comprising an overflow counter and a plurality of counters, each of the plurality of counters comprising a bit flag, wherein each bit flag is configured to indicate whether a corresponding one of said plurality of counters is in an overflow state;
for each loaded data line:
determine if a counter in the plurality of counters is in an overflow state based at least in part on a state of its bit flag;
generate security metadata at least in part by concatenating a current value of the overflow counter and a current value of only at least one counter that is determined to be in an overflow state; and
increment an overflow counter in the data line based on the counter being determined to be in an overflow state; and
encrypting said plaintext data with a cryptographic operation utilizing said security metadata.

15. The non-transitory machine-readable storage medium of claim 14, wherein said instructions when executed further result in performance of the following operations comprising:
determine whether reconfiguration of a data line is required at least in part by determining whether a current counter value of any of the plurality of counters in a data line is at or above a threshold value.

16. The non-transitory machine-readable storage medium of claim 15, further comprising instructions that, when executed by one or more processors, cause the one or more processors to:
when a current counter value of any of the plurality of counters of a data line is at or above the threshold value, cause at least one selector in the data line to remap a lower-level data line or memory location currently mapped to the counter having a current counter value at or above the threshold value.

17. The non-transitory machine-readable storage medium of claim 14, wherein the bit flag of each of the plurality of counters is further configured to indicate whether its respective counter relies on said overflow counter.

18. The non-transitory machine-readable storage medium of claim 14, wherein the instructions when executed further result in performance of the following operations comprising:
reformulate embedded memory authentication codes for only lower-level data lines that correspond to a counter of said plurality of counters that has a bit flag indicating that the counter is in an overflow state.

19. The non-transitory machine-readable storage medium of claim 18, wherein the instructions to reformulate the embedded memory authentication codes comprise instructions to perform a cryptographic operation on a corresponding lower-level data line utilizing as an input a concatenated current value of the overflow counter and a current value of at least one counter determined to be in the overflow state.

20. The non-transitory machine-readable storage medium of claim 14 wherein said instructions for generating said security metadata at least in part by concatenating comprises concatenating the current value of only at least one counter in the overflow state with the current value of the overflow counter and an address corresponding to a memory location.

* * * * *